US008929677B2

(12) United States Patent
Lim et al.

(10) Patent No.: US 8,929,677 B2
(45) Date of Patent: Jan. 6, 2015

(54) IMAGE PROCESSING APPARATUS AND METHOD FOR SYNTHESIZING A HIGH-RESOLUTION IMAGE AND A REFOCUSED IMAGE

(75) Inventors: Jae-Guyn Lim, Seongnam-si (KR); Joo-Young Kang, Yongin-si (KR); Byung-Kwan Park, Seoul (KR); Seong-Deok Lee, Suwon-si (KR); Won-Hee Choe, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 12/955,455

(22) Filed: Nov. 29, 2010

(65) Prior Publication Data

US 2011/0129165 A1 Jun. 2, 2011

(30) Foreign Application Priority Data

Nov. 27, 2009 (KR) ........................ 10-2009-0115912

(51) Int. Cl.
*G06K 9/40* (2006.01)
*H04N 5/232* (2006.01)
*H04N 5/262* (2006.01)
*G06T 3/40* (2006.01)
*H04N 5/272* (2006.01)

(52) U.S. Cl.
CPC ....... *H04N 5/23212* (2013.01); *H04N 5/23232* (2013.01); *H04N 5/2628* (2013.01); *G06T 3/4053* (2013.01); *H04N 5/272* (2013.01)
USPC .......................................... 382/255; 382/299

(58) Field of Classification Search
None
See application file for complete search history.

(56) References Cited

U.S. PATENT DOCUMENTS 5,926,582 A * 7/1999 Kakutani ...................... 382/299
6,154,574 A 11/2000 Paik et al.
(Continued)

FOREIGN PATENT DOCUMENTS

CN 101355631 A 1/2009
CN 101562701 A 10/2009
(Continued)

OTHER PUBLICATIONS

Liang, Chia-Kai, et al. "Programmable aperture photography: multiplexed light field acquisition." ACM Transactions on Graphics (TOG). vol. 27. No. 3. ACM, 2008.*

(Continued)

*Primary Examiner* — Bhavesh Mehta
*Assistant Examiner* — Andrew Moyer
(74) *Attorney, Agent, or Firm* — NSIP Law

(57) ABSTRACT

An image processing apparatus and image processing method capable of providing a high-resolution image for a desired position by use of light field data are provided. The image processing apparatus may determine a position of a portion of light field data among light field data corresponding to a scene, according to a desired focusing position, generate a refocusing first image by use of the position determined portion of light field data, generate a high-resolution image having a predetermined setting ratio relative to the refocusing first image, determine a ratio for local synthesis between the high-resolution image and an enlarged image of the refocusing first image by use of a similarity with respect to the position determined portion of light field data, and generate a synthesized image by synthesizing the high-resolution image and the enlarged image of the refocusing first image according to the local synthesis ratio.

23 Claims, 25 Drawing Sheets

(56) References Cited

U.S. PATENT DOCUMENTS

| | | | |
|---|---|---|---|
| 7,657,122 B2 | 2/2010 | Tanida et al. | |
| 7,916,208 B2 | 3/2011 | Kanehiro | |
| 2002/0191100 A1 | 12/2002 | Matsunaga et al. | |
| 2005/0128323 A1* | 6/2005 | Choi | 348/239 |
| 2007/0147820 A1 | 6/2007 | Steinberg et al. | |
| 2007/0252074 A1 | 11/2007 | Ng et al. | |
| 2007/0286517 A1 | 12/2007 | Paik et al. | |
| 2007/0292048 A1* | 12/2007 | Choe et al. | 382/286 |
| 2009/0027543 A1 | 1/2009 | Kanehiro | |
| 2009/0040321 A1 | 2/2009 | Nakamura | |
| 2010/0091133 A1* | 4/2010 | Lim et al. | 348/223.1 |

FOREIGN PATENT DOCUMENTS

| | | |
|---|---|---|
| JP | 2005-167484 | 6/2005 |
| JP | 2006-350889 | 12/2006 |
| JP | 2007-066199 | 3/2007 |
| JP | 2008-294741 | 12/2008 |
| JP | 2009-021683 | 1/2009 |
| KR | 10-1999-0040816 | 6/1999 |
| KR | 10-2005-0041640 | 5/2005 |
| KR | 10-2007-0118925 | 12/2007 |
| KR | 10-2010-0040643 | 4/2010 |

OTHER PUBLICATIONS

Kitamura, Yoshiro, et al. "Reconstruction of a high-resolution image on a compound-eye image-capturing system." Applied Optics 43.8 (2004): 1719-1727.*

Wang, Jue, and Michael F. Cohen. "Simultaneous matting and compositing." Computer Vision and Pattern Recognition, 2007. CVPR'07. IEEE Conference on. IEEE, 2007.*

Hasinoff et al., "A Layer-Based Restoration Framework for Variable-Aperture Photography," *In Proceeding of IEEE 11th International Conference on Computer Version, 2007(ICCV 2007)*, 2007, pp. 1-8.

Levin et al., "Image and Depth from a Conventional Camera with a Coded Aperture," Massachusetts Institute of Technology et al., pp. 1-9.

Ng et al., "Light Field Photography with a Hand-held Plenoptic Camera," *Stanford Tech Report CTSR* Feb. 2005, pp. 1-11.

International Search Report issued by the International Searching Authority on Aug. 2, 2011, in counterpart International Application No. PCT/KR2010/008328 (3 pages, in English).

Park, et al. "Super-resolution image reconstruction: a technical overview." *Signal Processing Magazine*, IEEE 20.3 (2003): pp. 21-36.

Lumsdaine, et al. "Full resolution lightfield rendering." *Indiana University and Adobe Systems, Tech. Rep* (2008). pp.1-2.

Bishop, et al. "Light field superresolution." *Computational Photography (ICCP)*, 2009 *IEEE International Conference on*. IEEE, 2009. 10 Pages.

Lim, et al. "Improving the spatail resolution based on 4D light field data." *Image Processing (ICIP)*, 2009 16th *IEEE International Conference on*. IEEE, 2009. pp. 1173-1176.

Extended European Search Report issued Aug. 22, 2013 for the corresponding European Application No. 10833550.6.

Chinese Office Action issued on Aug. 29, 2014 in counterpart Chinese Application No. 201080052839.X (19 pages, with English translation).

* cited by examiner

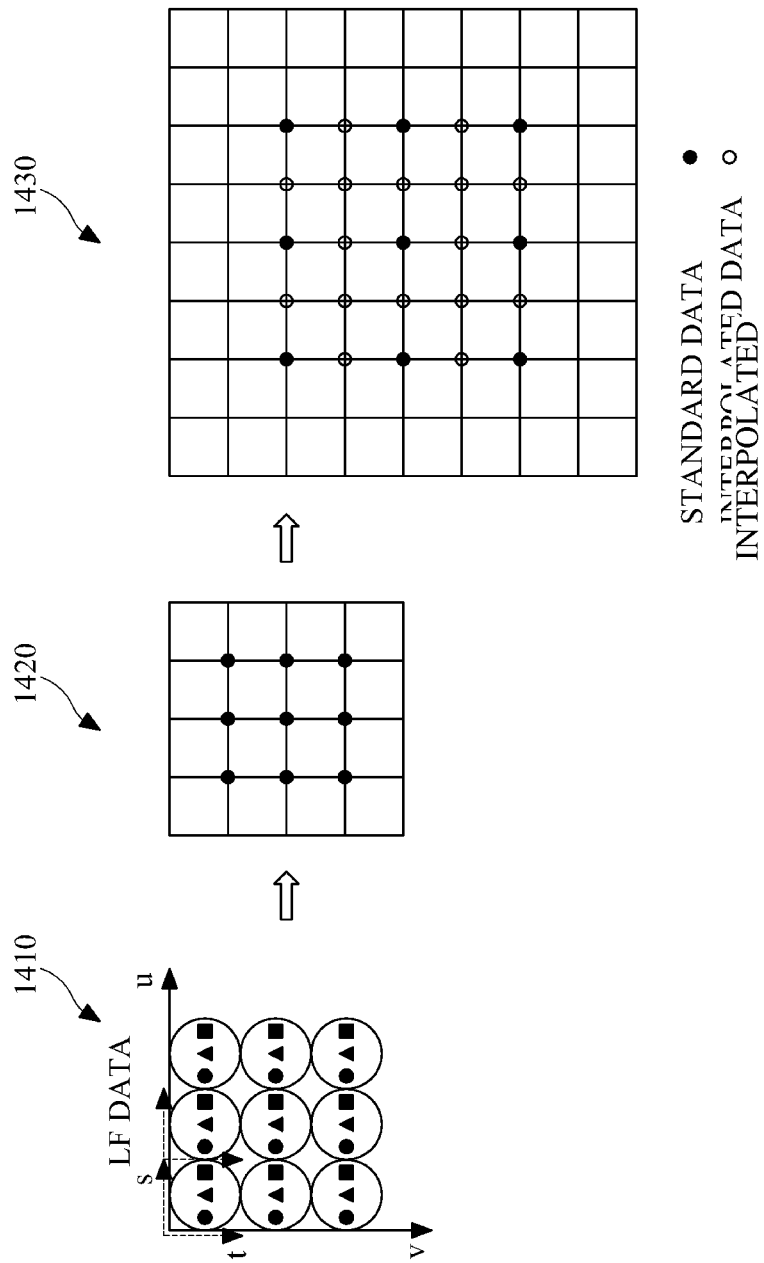

IMAGE PROCESSING APPARATUS AND METHOD FOR SYNTHESIZING A HIGH-RESOLUTION IMAGE AND A REFOCUSED IMAGE

CROSS-REFERENCE TO RELATED APPLICATION(S)

This application claims the benefit under 35 U.S.C. §119(a) of Korean Patent Application No. 10-2009-0115912, filed on Nov. 27, 2009, the entire disclosure of which is incorporated herein by reference in its entirety for all purposes.

BACKGROUND

1. Field

The following description relates to photography. More particularly, this description relates to an apparatus and method to process an image using light field data.

2. Description of the Related Art

Currently, photography systems generally use one photograph operation that enables only one image to be viewed at a time. However, research has been conducted on a plenoptic camera having a focus recombination function. The plenoptic camera, also referred to as a light field camera, captures 4-dimensional light field information of a scene using a microlens array (e.g., a lenticular lens array) or a light coded mask. Such a plenoptic camera may provide a user with various functions, such as changing a focal plane and enabling a scene to be viewed from several angles, after one photograph operation, i.e., after a single image capture. A plenoptic camera can be used to reduce a correspondence problem in stereo matching, i.e., in linking stereo images together.

In addition, high-resolution images are needed in many areas, for example, surveillance cameras, computed tomography (CT) images for precision diagnosis, computer vision for pattern recognition, geological survey satellite images, etc. In order to obtain high-resolution images, research has been conducted to provide methods of reconstructing a high-resolution image from a sequence of low-resolution images using signal processing technologies.

SUMMARY

In one general aspect, there is provided an image processing apparatus, including: a light field data position determiner configured to determine a position of a portion of light field data among light field data corresponding to a scene, according to a desired focusing position, a refocusing image generator configured to generate a refocusing first image by use of the position determined portion of light field data, a high resolution image generator configured to generate a high-resolution image including a predetermined setting ratio, relative to the refocusing first image, a synthesis ratio determiner configured to determine a ratio for local synthesis between the high-resolution image and an enlarged image of the refocusing first image, by use of a similarity with respect to the position determined portion of light field data, and an image synthesizer configured to generate a synthesized image by synthesizing the high-resolution image and the enlarged image of the refocusing first image, according to the local synthesis ratio.

In the image processing apparatus, the light field data position determiner may be further configured to: set a second image, corresponding to a part of an image representing the scene, and including the desired focusing position, generate a plurality of refocusing images for the second image while changing a varying alpha value, the varying alpha value representing a relationship between a photographic plane and a refocusing plane, determine a final alpha value, from the varying alpha value, the final alpha value allowing a highest sharpness refocusing image to be generated for the second image, and determine the position of the portion of light field data by use of the determined final alpha value.

In the image processing apparatus, the synthesis ratio determiner may be further configured to determine the ratio for local synthesis, such that the high-resolution image is synthesized with a higher synthesis ratio for a portion including a higher similarity with respect to the position-determined portion of light field data.

In the image processing apparatus, the synthesis ratio determiner may include: a non-uniformity map generator configured to generate a non-uniformity map representing a non-uniformity of intensity of light field data at the determined position, a ratio non-uniformity map generator configured to generate a ratio non-uniformity map including information about the ratio for local synthesis between the high-resolution image and the enlarged image of the refocusing first image, by use of the non-uniformity map, and a ratio non-uniformity map enlarger configured to enlarge the ratio non-uniformity map at the setting ratio.

In the image processing apparatus, the image synthesizer may be further configured to: enlarge the refocusing first image at the setting ratio, and synthesize the enlarged image of the refocusing first image and the high-resolution image at the determined ratio for local synthesis.

In the image processing apparatus, the high-resolution image generator may include: an image frame determiner configured to determine a standard image frame and at least one reference image frames, by use of the position determined portion of light field data including the position, the position being determined by the determined final alpha value, a point spread function determiner configured to determine a point spread function, based on an amount of sub-pixel displacement of the at least one reference image frame with respect to the standard image frame, an image interpolator configured to generate a high-resolution standard image frame including a higher resolution than the standard image frame by interpolating the standard image frame, and an image restorer configured to restore the high-resolution image by updating the high resolution standard image frame using the generated high-resolution standard image frame, the point spread function, and the at least one reference image frame.

In the image processing apparatus, the amount of sub-pixel displacement may represent a position difference between light field data corresponding to the standard image frame and light field data corresponding to each reference image frame.

In the image processing apparatus, the image frame determiner may be further configured to: determine a view image seen from an angle as the standard image frame, and determine at least one view image seen from another angle as the reference image frame by use of the position determined portion of light field data including the position, the position being determined by the final alpha value.

In the image processing apparatus, the point spread function determiner may be further configured to determine, as the point spread function, a two-dimensional Gaussian function, based on the amount of sub-pixel displacement of the each reference image frame with respect to the standard image frame.

In the image processing apparatus, the image restorer may include: a residual value generator configured to generate a residual value by use of the generated high-resolution standard image frame, one of the reference image frames, and a point spread function based on the one reference image frame and the standard image frame, and an image updater configured to update the high-resolution standard image frame by use of the residual value.

In the image processing apparatus, the residual value may include a value of the one reference image frame minus a convolution of the high-resolution standard image frame with the point spread function.

In the image processing apparatus, if the high-resolution standard image frame is updated, the residual value generator may be further configured to generate a residual value by use of the updated high-resolution standard image frame, another one of the at least one reference image frame, and a point spread function based on the another one of the at least one reference image frame and the standard image frame.

In the image processing apparatus, the residual value may include a value of the another one of the at least one reference image frame minus a convolution of the updated high-resolution standard image frame with the point spread function.

The image processing apparatus may further include a light field data capturer, the light field data capturer including: a first optical unit configured to form an image of an object, a photo sensor array configured to capture light rays, and a second optical unit disposed between the first optical unit and the photo sensor array, and configured to direct the light rays toward the photo sensor array by separating the light rays based on the direction of the light rays.

In another general aspect, there is provided an image processing method, the method including: determining a position of a portion of light field data among light field data corresponding to a scene, according to a desired focusing position, generating a refocusing first image by use of the position determined portion of light field data, generating a high-resolution image including a predetermined setting ratio, relative to the refocusing first image, determining a ratio for local synthesis between the high-resolution image and an enlarged image of the refocusing first image, by use of a similarity with respect to the position determined portion of light field data, and generating a synthesized image by synthesizing the high-resolution image and the enlarged image of the refocusing first image, according to the local synthesis ratio.

In the image processing method, the determining of the position of the portion of light field data may include: setting a second image corresponding to a part of an image representing the scene and including the desired focusing position, generating a plurality of refocusing images for the second image while changing a varying alpha value the varying alpha value representing a relationship between a photographic plane and a refocusing plane, determining a final alpha value, from the varying alpha value, the final alpha value allowing a highest sharpness refocusing image to be generated for the second image, and determining the position of the portion of light field data by use of the determined alpha value.

In the image processing method, in the determining of the ratio for local synthesis, the ratio for local synthesis may be determined such that the high-resolution image is synthesized with a higher synthesis ratio for a portion including a higher similarity with respect to the position-determined portion of light field data.

In the image processing method, the determining of the ratio for local synthesis may include: generating a non-uniformity map representing a non-uniformity of intensity of light field data at the position determined by an alpha value representing a relationship between a photographic plane and a refocusing plane, generating a ratio non-uniformity map including information about the ratio for local synthesis between the high-resolution image and the enlarged image of the refocusing first image by use of the non-uniformity map, and enlarging the ratio non-uniformity map at the setting ratio.

In the image processing method, the generating of the synthesized image may include: enlarging the refocusing first image at the setting ratio, and synthesizing the enlarged image of the refocusing first image and the high-resolution image at the determined ratio for local synthesis.

In the image processing method, the generating of the high resolution image may include: determining a standard image frame and at least one reference image frames, by use of the determined alpha value, determining a point spread function, based on an amount of sub-pixel displacement of the at least one reference image frame with respect to the standard image frame, generating a high-resolution standard image frame including a higher resolution than the standard image frame, by interpolating the standard image frame, and restoring the high-resolution image by updating the high-resolution standard image frame using the generated high-resolution standard image frame, the point spread function, and the at least one reference image frame.

In another general aspect, there is provided a method of processing an acquired four-dimensional (4D) light field, the method including: determining a desired focusing position and estimating an alpha value for the focusing position, the alpha value representing a relationship between a photographic plane and a refocusing plane, generating a refocusing image from angular data according to the alpha value, generating a high-resolution image by increasing a resolution of a focusing region, based on a sub-pixel displacement of the angular data according to the alpha value, dividing the focusing region from an out-of-focus region by checking a similarity of the angular data according to the alpha value, and performing fusion on the refocusing image and the high-resolution image.

In the method, the alpha value may be determined by varying the alpha value until a highest sharpness refocusing image is generated.

In another general aspect, there is provided an image processing method, including: from light field data corresponding to a scene, generating a refocusing image corresponding to a part of an image representing the scene, the refocusing image including a desired focusing position, generating an enlarged image of the refocusing image, generating a high resolution image corresponding to the enlarged image using the light field data corresponding to the part of the image, and generating a synthesized image based on the high resolution image and the enlarged image.

In the method, the refocusing image may include a highest sharpness among a plurality of images corresponding to the part of the image.

In the method, the synthesized image may be generated by synthesizing the high resolution image and the enlarged image according to a calculated ratio.

A computer-readable information storage medium may store a program for causing a computer to implement the above methods.

Other features and aspects may be apparent from the following detailed description, the drawings, and the claims.

BRIEF DESCRIPTION OF THE DRAWINGS

FIG. 14 is a diagram showing generation of an example high-resolution standard image frame based on a standard image frame.

Figure 1:
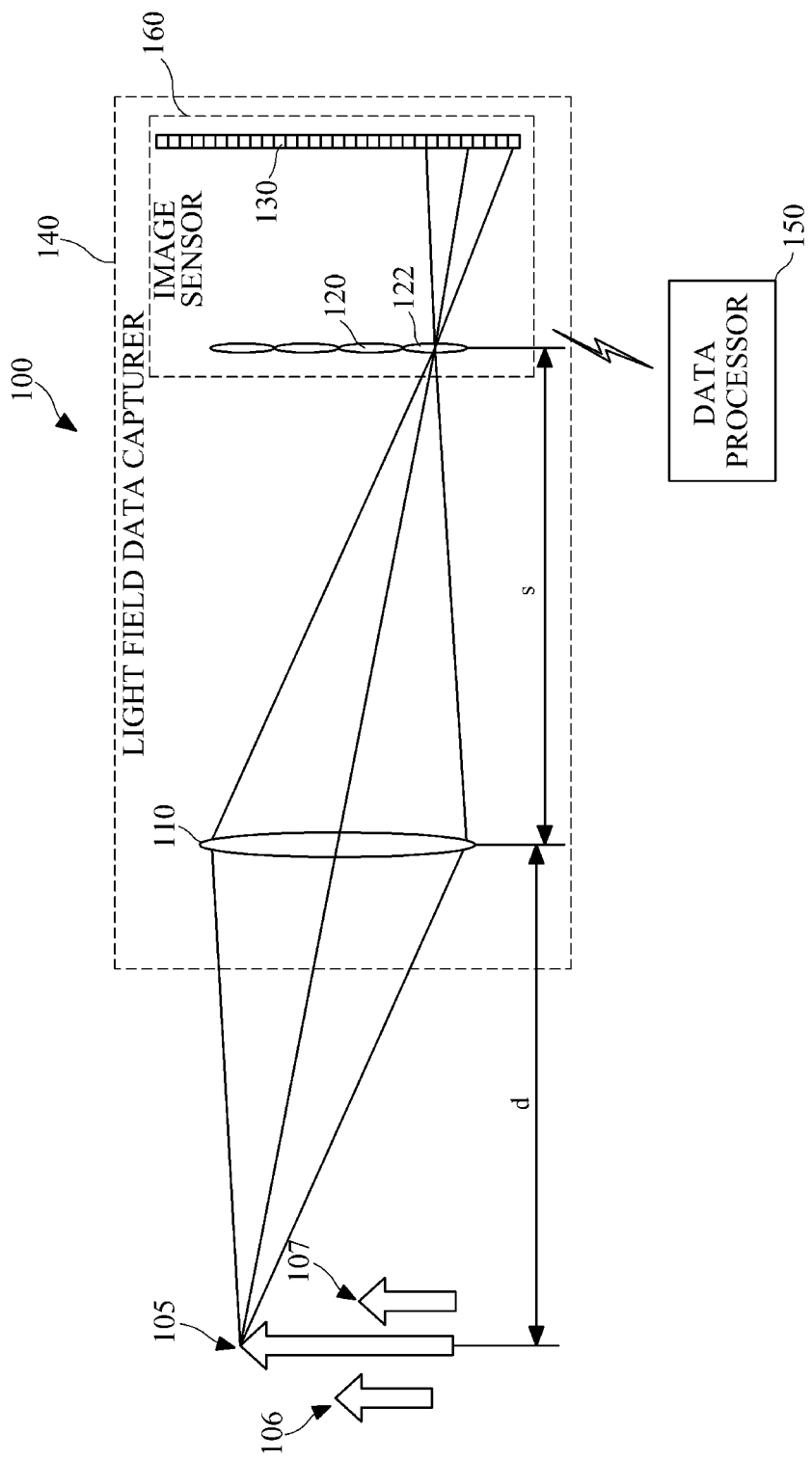
FIG. 1 is a diagram showing an example image processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example. The sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a diagram showing an example image processing apparatus.

The image processing apparatus 100 may include a light field data capturer 140 and a data processor 150 to process captured light field data. The light field data capturer 140 may include a main lens 110 to form an image of an object, a photosensor array 130, and a microlens array 120. The microlens array 120 may separate light rays passing through the main lens 110 based on a direction of the light rays, and may direct the light rays toward the photosensor array 130. In one example, the microlens array 120 and the photosensor array 130 may be implemented using an image sensor 160. Using such an image processing apparatus, a refocused image or images seen from several angles may be acquired (e.g., an image view may be adjusted).

Light rays from a single point on an object 105 in an imaged scene may arrive at a single convergence point in a focal plane of the microlens array 120. A microlens 122 at this convergence point may separate the light rays based on the light direction, and may generate a focused image of an aperture of the main lens 110 on a photosensor corresponding to the microlens.

The photosensor array 130 may detect light incident thereon, and may generate an output processed by using at least one of several components. The output light data may be sent to the data processor 150 together with position information about each photosensor providing data, for example, when an image of a scene including objects 105, 106, and 107 is generated.

The data processor 150 may be implemented using, for example, a computer, including a common component (e.g., one chip) or different components, or some other processing circuit. In one example, one part of the data processor 150 may be implemented inside the light field data capturer 140, while another part may be implemented by an external computer. The data processor 150 may be configured to process image data and to calculate an image of a scene including the objects 105, 106, and 107.

The data processor 150 may selectively refocus and/or correct data using detected light or features of detected light together with a known direction of light arriving at the microlens array 120 (e.g., calculated using a known position of each photosensor).

The microlens array 120 illustrated in FIG. 1 may include several distinguishable microlenses, but an array may be made of a great number (e.g., several thousand or several tens of thousands) of microlenses. The microlens array 120 may also be implemented in other forms, such as an optical encoding mask that replaces the microlens array 120, so long as the replacement separates light rays passing through the main lens 110 based on their direction. When the main lens 110 is referred to as a "first optical unit," the microlens array 120 may be referred as a "second optical unit." The main lens 110 and the microlens array 120 may be implemented using various lenses and/or microlens arrays that are currently usable or are developed in the future.

The photosensor array 130 may include several photosensors for each microlens in the microlens array 120. The size of each pixel (e.g., the pitch) of the photosensor array 130 may be relatively smaller than the pitch of the microlens array 120. Also, microlenses in the microlens array 120 and photosensors in the photosensor array 130 may be positioned such that light propagating through each microlens toward the photosensor array does not overlap with light propagating through adjacent microlenses.

The main lens 110 may have the ability to move horizontally along the optical axis in order to focus on an object of interest at a desired depth "d" as shown between the main lens 110 and the example photographing object 105, as illustrated in FIG. 1. Accordingly, the main lens 110 may refocus light beams at a desired position based on obtained light field data.

For example, light rays from a single point of the object 105 may arrive at a single convergence point on the microlens 122 in the focal plane of the microlens array 120. The microlens 122 may separate these light rays based on their direction, and may generate a focused image corresponding to the aperture of the main lens 110 on a pixel set in the pixel array below the microlens and light field data of the focused image.

Figure 2:
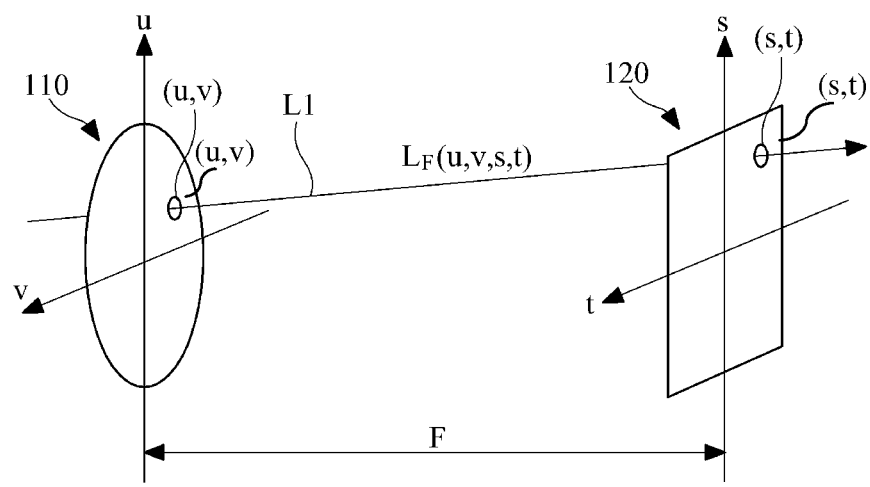
FIG. 2 is a diagram used to explain an image processing using light field data.

FIG. 2 is a diagram used to explain an image processing using light field data.

Considering a two-plane (2-plane) light field "L" inside the image processing apparatus 100, light field data L(u,v,s,t) may represent light propagating along a ray that intersects the main lens 110 at position (u,v) and intersects the plane of the microlens array 120 at position (s,t). The light field data L(u,v,s,t) may represent location information and propagation direction information of a ray. For example, the light field data L(u,v,s,t) may represent an intensity value of a light beam which passes through the position (u,v) of a sub-aperture of the main lens 110 and passes through the position (s,t) of each microlens. For instance, "sub-aperture" refers to the number of directional resolution of the main lens 110. For example, when the sub-aperture number is 196, each microlens array 120 may be configured to correspond to 196 pixels.

Each photosensor in the photosensor array 130 may be configured to provide a value representing a light ray set directed toward the photosensor through the main lens 110 and the microlens array 120. Each photosensor may generate an output in response to light incident on the photosensor, and the position of each photosensor with respect to the microsensor array 120 may be used to provide directional information about the incident light.

The image formed below the particular microlens 122 in the microlens array 120 may indicate system directional resolution regarding the position in the photographic plane. The main lens 110 may be effectively at an infinite optical distance from the microlens, and the photosensor array 130 may be located in one plane at the focal depth of the microlens in order to focus the microlens. A separation distance "s" (see FIG. 1) between the main lens 110 and the microlens array 120 may be selected within the depth of field of the microlens to achieve a sharp image.

The aperture size of the main lens 110 and the aperture size of the microlens in the microlens array 120 (e.g., the effective size of an opening in the lens) may be selected to be suitable for a particular application of the image processing apparatus 100.

The data processor 150 may generate a refocusing image using the light field data (e.g., L(u,v,s,t)). L is a light path, for example, L1 may be a first light path. At this time, the data processor 150 may determine the direction of light on each photosensor using the position of each photosensor with respect to the microlens. Also, the data processor 150 may determine depth of field of an object within a scene over which the detected light beam spreads out, and may calculate a refocusing image focused in a different focal plane by using the depth of field and direction of detected light.

Figure 3:
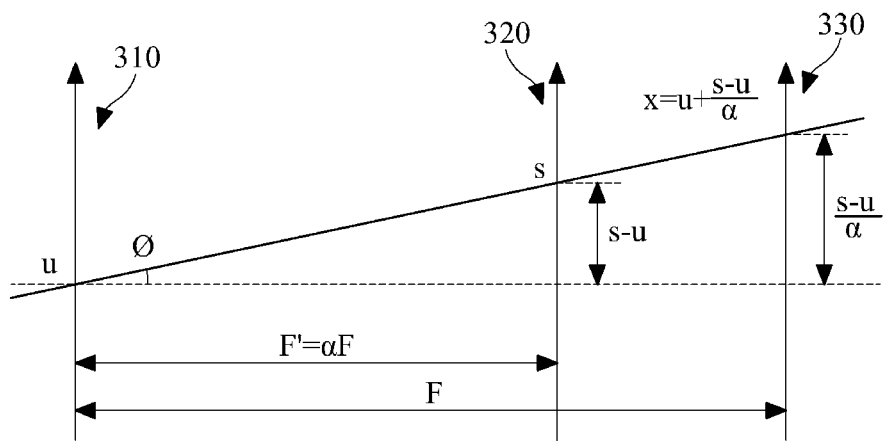
FIG. 3 is a diagram showing a method of generating a refocusing image by a data processor of the image processing apparatus shown in FIG. 1.

FIG. 3 is a diagram showing a method of generating a refocusing image by a data processor of the image processing apparatus shown in FIG. 1.

As shown in FIG. 3, if the distance between a plane 310 of the main lens 110 and a photographic plane 330, on which the photosensor array 130 is located, is F; and the distance between the plane 310 of the main lens 110 and a refocusing plane 320 is F'; then F'=αF. Where the point s on a line from point u on the plane 310 meets the refocusing plane 320 at F'=αF, the vertical distance is s−u, and the angle is Φ. Where the same line from u at the plane 310 to point s meets the photographic plane 330, x=u+((s−u)/α), and the vertical distance is (s−u)/α. In one example, the detection intensity $L_{F'}$ on the photographic plane 330 corresponding to the coordinates (s,t) on the refocusing plane 320 may be expressed by Equation 1 shown below.

$$L_{F'}(u, v, s, t) = L_{(\alpha \cdot F)}(u, v, s, t) \quad (1)$$
$$= L_F\left(u, v, \frac{(\alpha-1)u+s}{\alpha}, \frac{(\alpha-1)v+t}{\alpha}\right)$$

By using Equation 1, a light field data value regarding an object producing a focal point on the refocusing plane 320 may be selected by an alpha value α, which represents a position relationship between the photographic plane 330 and the refocusing plane 320. An image E(s,t) on the refocusing plane 320 may be obtained by performing an integral on the detection intensity $L_{F'}$ of Equation 1 with respect to an aperture of the main lens 110, and the image E may be expressed as Equation 2 shown below.

$$E(s, t) = \int L_F\left(u, v, \frac{(\alpha-1)u+s}{\alpha}, \frac{(\alpha-1)v+t}{\alpha}\right) du\,dv \quad (2)$$

Accordingly, an image set on a focal point, for example, the refocusing plane 320, may be synthesized based on image data that may be obtained through data processing by use of refocusing operation shown as Equation 2.

Figure 4:
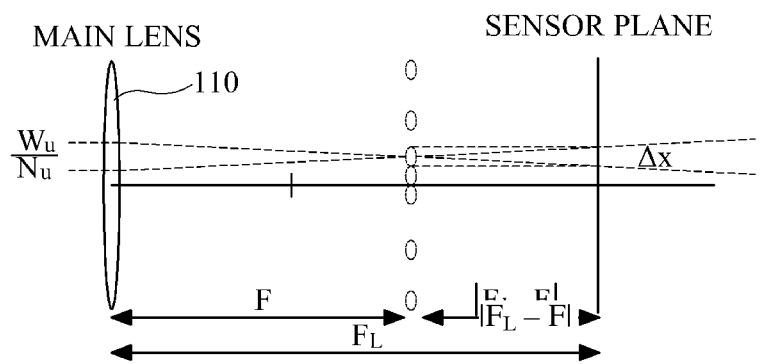
FIG. 4 is a diagram showing relationships between an example plenoptic camera's directional resolution, spatial resolution, and photosensor pixel size.

FIG. 4 is a diagram showing relationships between an example plenoptic camera's directional resolution, spatial resolution, and photosensor pixel size.

The plenoptic camera's spatial sampling rate and directional sampling rate may be represented by Δx and Δu, respectively. The camera sensor's width may be represented by $W_x$, and the width of the lens aperture may be represented by $W_u$. Thus, a photosensor's spatial resolution may be expressed as $N_x=W_x/\Delta x$, and the light field camera's directional resolution may be expressed as $N_u=W_u/\Delta u$.

In order to perform refocusing at a desired distance, the following Equation 3 may be satisfied:

$$\Delta x \cdot N_u \geq \frac{|F-F_L|}{F_L} \cdot W_u, \quad (3)$$

where F represents a focal distance of the main lens, and $F_L$ represents a focal distance from the object according to a desired range of refocusing. That is, F and $F_L$ represent a range of focal depth that may enable more precise refocusing.

For example, when $W_u=20$ mm, F=80 mm, and the distance of an object for refocusing is up to 1 m; substitution into Equation 1 above yields $\Delta x \cdot N_u \geq 1.59$ mm. In a sensor containing 4145×4145 pixels, in which a target spatial resolution of an image is 1400×1400, about 3 (e.g., 4150/1400) pixels may be capable of expressing directional resolution.

However, when the refocusing range is set at 1 m to ∞, and the pitch of one pixel of the sensor is 9 μm, the required directional resolution $N_u$ may be at least 58 (e.g., 1.59 mm/(3 pixels×9 μm)). That is, when the refocusing range is 1 m to ∞, it may be impossible to obtain a spatial resolution of 1400× 1400. Accordingly, it may be desirable to change the refocusing range or the target spatial resolution.

Table 1 below lists examples of permissible Δx and desired $N_u$ to express directional resolution with respect to target spatial resolution under the above presumptions.

TABLE 1

| Target Spatial Resolution | 1400 × 1400 | 700 × 700 | 350 × 350 | 300 × 300 |
|---|---|---|---|---|
| Permissible Δx | 27 μm (3 pixels) | 54 μm (6 pixels) | 108 μm (12 pixels) | 126 μm (14 pixels) |
| Needed $N_u$ | 58 | 30 | 15 | 13 |

Referring to Table 1, when the refocusing range is set at 1 m to ∞ and the spatial resolution is set to 300×300, a directional resolution of 13×13 may be possible, and the above refocusing range may be secured. That is, when the sensor size is fixed, it may be difficult to secure a desired spatial resolution, and in order to obtain the desired spatial resolution, a larger sensor is required.

According to the example, the data processor 150 may process light field data such that a high-resolution image may be obtained at a desired region of a refocusing image by use of the light field data. In order to acquire a high-resolution image, light field data may be set as spatially sub-sampled data and defined as low-resolution data for improving resolution. Also, registration and reconstruction of the low-resolution data may be performed by defining a sub-pixel displacement of the position of a sub-sampled low-resolution image with respect to the position of a standard low-resolution image among the low-resolution data. Accordingly, spatial resolution may be improved by signal processing a desired location of the image generated using light field data.

Figure 5:
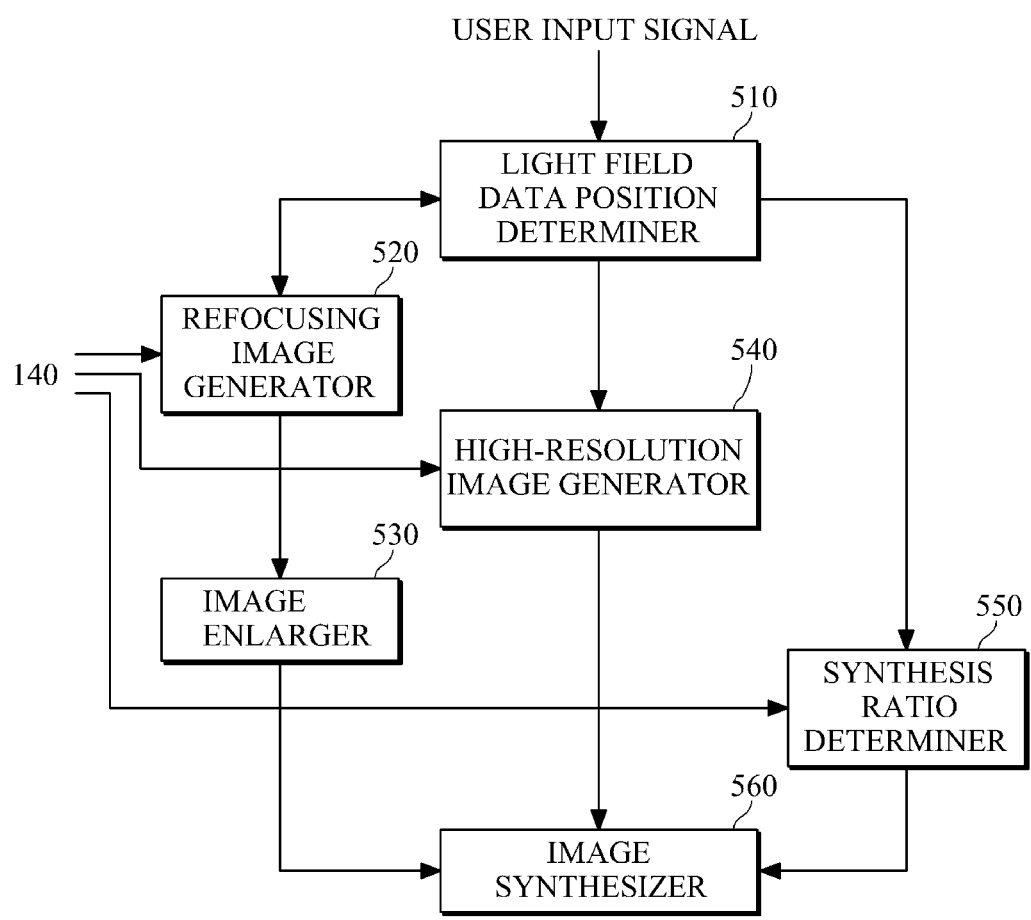
FIG. 5 is a block diagram showing an example data processor of the image processing apparatus shown in FIG. 1.

FIG. 5 is a block diagram showing an example data processor of the image processing apparatus shown in FIG. 1.

The data processor 150 may include a light field data position determiner 510, a refocusing image generator 520, an image enlarger 530, a high-resolution image generator 540, a synthesis ratio determiner 550, and an image synthesizer 560.

The light field data position determiner 510 may determine a position of a portion of light field data among light field data corresponding to a scene, according to a desired focusing position. For example, the light field data position determiner 510 may set a second image corresponding to a part of an image representing the scene and including the desired focusing position, and may generate a plurality of refocusing images for the second image while varying an alpha (α) value representing a relationship between a photographic plane and a refocusing plane. After that, the light field data position determiner 510 may determine one of the alpha values which allows a highest sharpness image to be generated among the plurality of refocusing images for the second image, and may determine the position of the portion of light field data by use of the determined alpha value.

The refocusing image generator 520 may generate a first image refocused by use of light field data which may be selected by the alpha value, representing a location relationship between a photographic plane and a refocusing plane, among light field data corresponding to a predetermined scene.

The image enlarger 530 may enlarge the refocusing first image at a setting ratio (m). The setting ratio (m) is set such that the enlarged image may have the same size as that of a high-resolution image that is to be generated by the high-resolution image generator 540. For example, if the first image has a size of S×T, the enlarged image of the refocusing first image and the high-resolution image may each have the size of mS×mT. In FIG. 5, the image enlarger 530 may be implemented separately from the image synthesizer 560, but another example of the image enlarger 530 may be included in the image synthesizer 560.

The high-resolution image generator 540 may generate a high-resolution image having a setting ratio (m) relative to the first image by use of light field data for a scene. The high-resolution image generator 540 may define light field data as low-resolution data used to restore the high-resolution image, and may generate the high-resolution image through a high-resolution image restoring scheme using the defined low-resolution data. The detailed configuration and operation of the high-resolution image generator 540 will be described with reference to FIG. 11 below.

The synthesis ratio determiner 550 may determine a ratio for local synthesis between the high-resolution image and the enlarged image of the first image by use of a similarity with respect to the position determined portion of light field data according to a desired focusing position. The synthesis ratio determiner 550 may determine the ratio for local synthesis such that the high-resolution image may be synthesized at a higher synthesis ratio for a portion having a higher similarity with respect to the position-determined portion of light field data. The detailed configuration and operation of the synthesis ratio determiner 550 will be described with reference to FIG. 8.

The image synthesizer 560 may generate a synthesized image by synthesizing the high-resolution image and the enlarged image of the refocusing first image according to the determined local synthesis ratio.

For example, when an enlarged image of the first image has a synthesis ratio of R for each pixel constituting an image, a pixel value C for each pixel of a synthesized image may be calculated according to Equation 4 shown below.

$$C_{(x,y)} = [(1-R) \times RRM + R \times ErFM]_{(x,y)} \quad (4)$$

For instance, x and y represent coordinates of a pixel constituting a synthesized image, respectively. Resolution-Recovered Image (RRM) represents a pixel value of corresponding coordinates of the high-resolution image that is generated from the high-resolution image generator 540, and Enlarged re-Focusing Image (ErFM) represents a pixel value of corresponding coordinates of the enlarged first image that is output from the image enlarger 530.

Figure 6A:
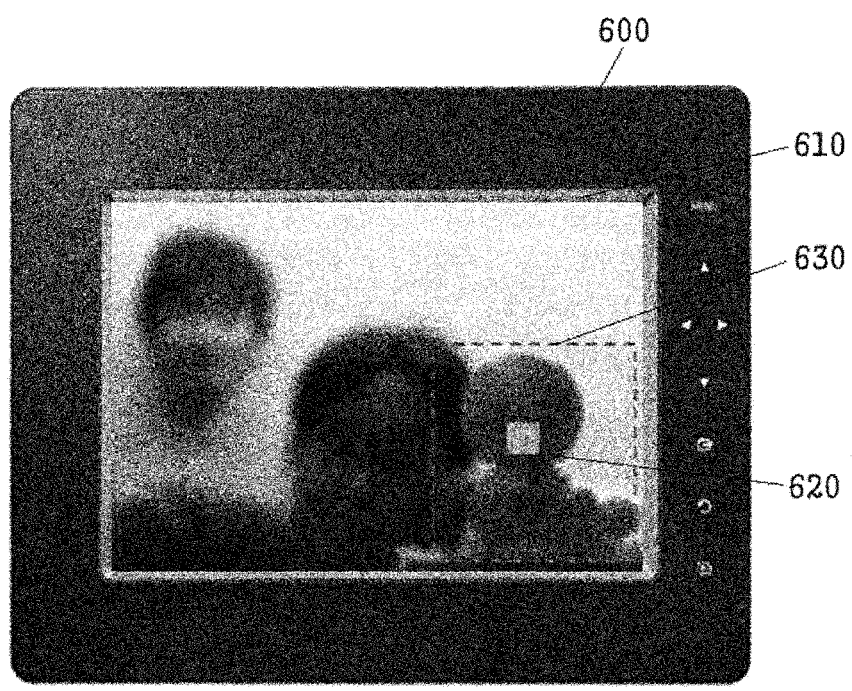
FIG. 6A is a diagram showing a refocusing image according to a certain alpha value, the refocusing image being viewed on a display of the image processing apparatus.
Figure 6B:
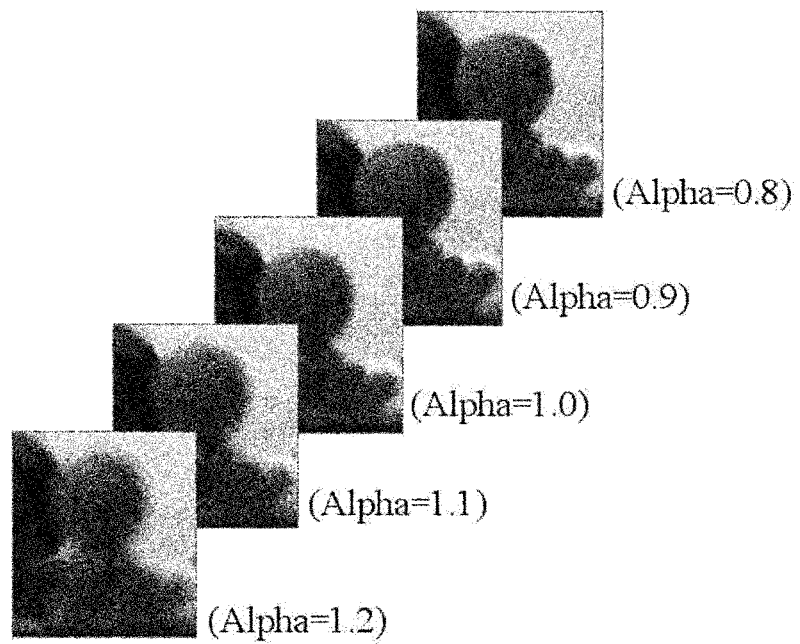
FIG. 6B is a diagram showing a plurality of refocusing images generated while varying the alpha value.
Figure 6C:
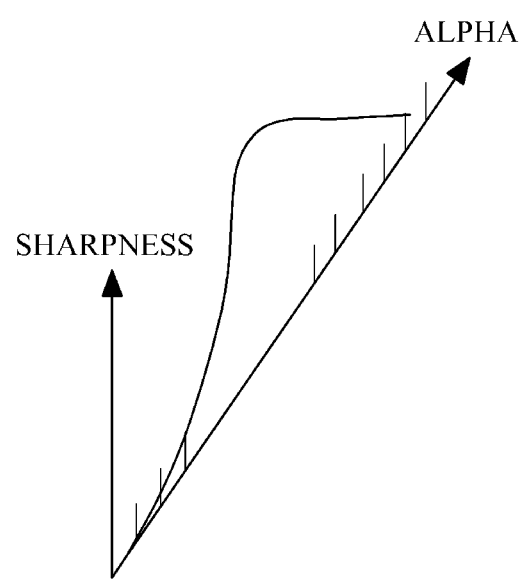
FIG. 6C is a graph representing the sharpness of refocusing images according to the change of the alpha value of FIG. 6B.

FIGS. 6A to 6C are diagrams showing an example of an operation of determining an alpha (α) value.

FIG. 6A is a diagram showing a refocusing image according to a certain alpha (α) value, the refocusing image being viewed on a display of the image processing apparatus. The image is a refocusing image according to a certain alpha value. FIG. 6B is a diagram showing a plurality of refocusing images generated while varying the alpha value. If a user selects a desired focusing position 620 by use of a user input device such as a mouse and a touch pad, the desired focusing position 620 may be selected and a region 630 including the desired focusing position 620 may be set. An image corresponding to the region 630 of selection is referred to as a "second image." The region 630 of selection corresponding to the second image may be set in various forms other than the grid shown in FIG. 6A.

After the second image, corresponding to a certain region of an image representing a scene, is selected according to a user input signal, the light field data position determiner 510 may generate a plurality of refocusing images for the second image while changing or varying the alpha value as shown in FIG. 6B. To this end, the light field data position determiner 510 may be configured to generate refocusing images for the second image according to the change of the alpha value, and may control the refocusing image generator 520 to generate refocusing images.

The light field data position determiner 510 may select one of the varying alpha values as a final alpha value which may generate a refocusing image having the highest sharpness. FIG. 6C is a graph representing the sharpness of refocusing images according to the change of the alpha value of FIG. 6B. The sharpness of images may be measured through a method of measuring sharpness that may be generally known or to be known in the future. For example, in FIG. 6C, the final alpha value generating a refocusing image having the highest sharpness may be determined to be 0.76.

Figure 7A:
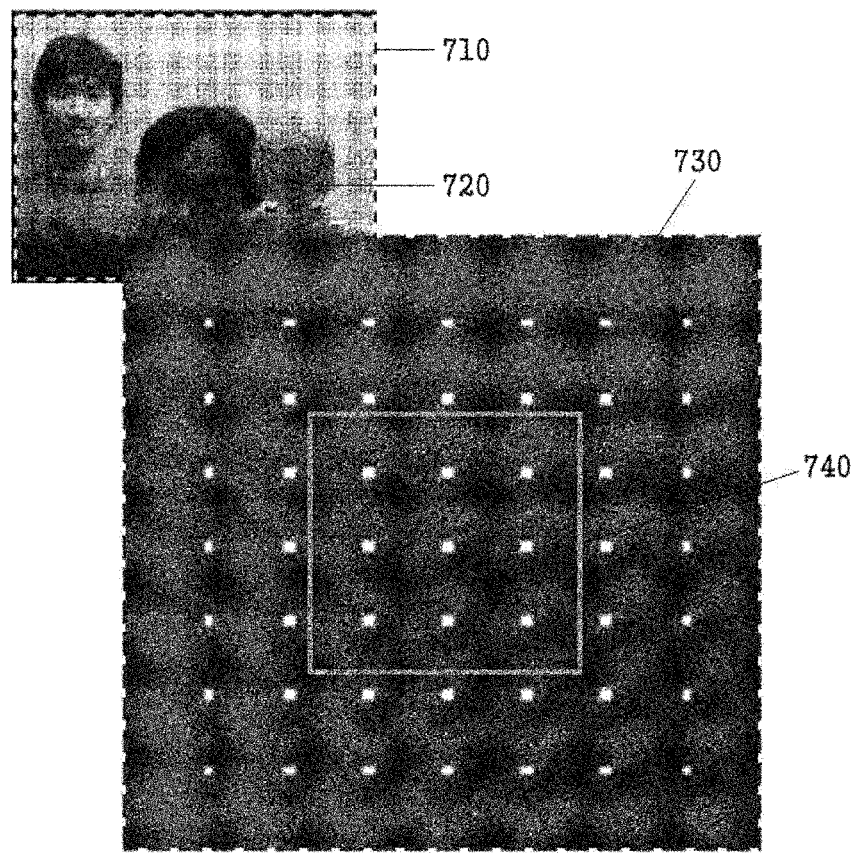
FIG. 7A is a diagram showing light field data values for a focus region.
Figure 7B:
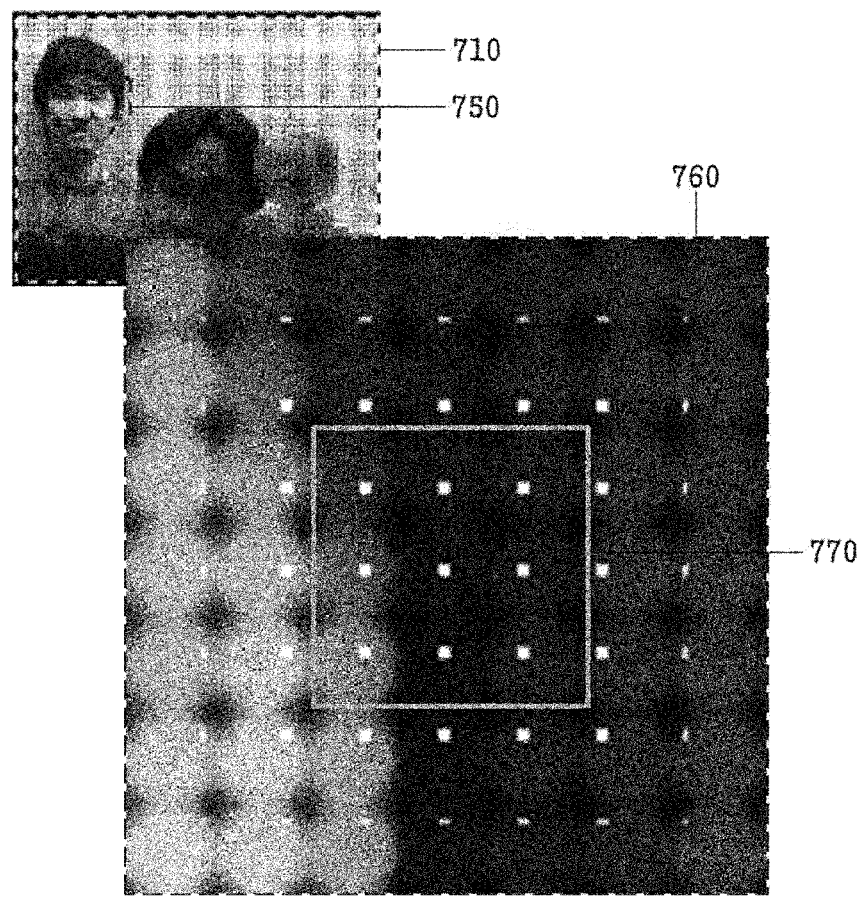
FIG. 7B is a diagram showing light field data values for an out-of-focus region.

FIGS. 7A and 7B illustrate determined final alpha value based light field data values that may be used to generate a non-uniformity map.

In FIG. 7A, light field data 730 represents a part of light field data observation values that may be used to generate an image 710 for a scene. A portion 740 of light field data 730 is light field data corresponding to a focusing region of the image 710, that is, a region 720 of the image 710 having an object that is focused on a refocusing plane by light rays when the alpha value is 0.76. White points in the light field data 740 denote the positions of light field data when the alpha value is 0.76. As shown in FIG. 7A, the light field data at a position determined by the alpha value corresponding to the focusing position may have uniform values (e.g., intensity).

FIG. 7B shows light field data values for an out-of-focus region other than the focusing region. In FIG. 7B, light field data 760 represents a part of light field data observation values that may be used to generate an image 710 for a scene. A portion 770 of the light field data 760 is light field data corresponding to a region 750 of the image 710 having an object that is outside of the focusing region. White points in the light field data 740 denote the positions of light field data when the alpha value is 0.76. As shown in FIG. 7B, light field data at a position which is determined by the alpha value corresponding to the out-of-focus position may have non-uniform values (e.g., intensity).

According to this example, a ratio for local synthesis of a simply enlarged refocusing image and a high-resolution image may be determined according to the non-uniformity of light field data in the focusing region and the out-of-focus region that may be determined by the alpha value.

Figure 8:
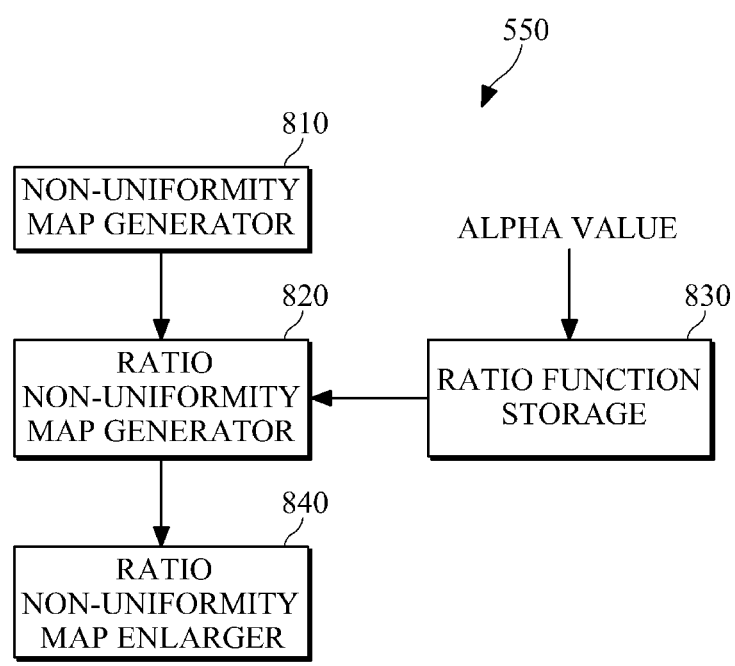
FIG. 8 is a diagram showing an example synthesis ratio determiner shown in FIG. 5.

FIG. 8 is a diagram showing an example synthesis ratio determiner shown in FIG. 5.

The synthesis ratio determiner 550 may include a non-uniformity map generator 810, a ratio non-uniformity map generator 820, a ratio function storage 830, and a ratio non-uniformity map enlarger 840.

The non-uniformity map generator 810 may generate a non-uniformity map representing the non-uniformity of intensity of light field data at each location of light field data that may be determined according to a desired focusing position. The non-uniformity map may have the same size as that of the refocusing image. In order to measure the similarity in intensity value of light field data at a location of the light field data that is determined according to a desired focusing position, various types of methods of calculating the uniformity that are generally known or to be known in the future may be used, for example, Standard Deviation or 1-sigma uniformity. After the uniformity is calculated, the non-uniformity that have a relation to compensate for the uniformity may be calculated using the calculated uniformity.

The ratio non-uniformity map generator 820 may generate a ratio non-uniformity map, including information about a ratio for local synthesis between the high-resolution image and the enlarged refocusing image at a determined position, by use of the non-uniformity map. The ratio non-uniformity map generator 820 may generate the ratio non-uniformity map by use of a ratio function that may be stored in the ratio function storage 830. The ratio function may be preset and stored in a storage, such as the ratio function storage 830.

Figure 9:
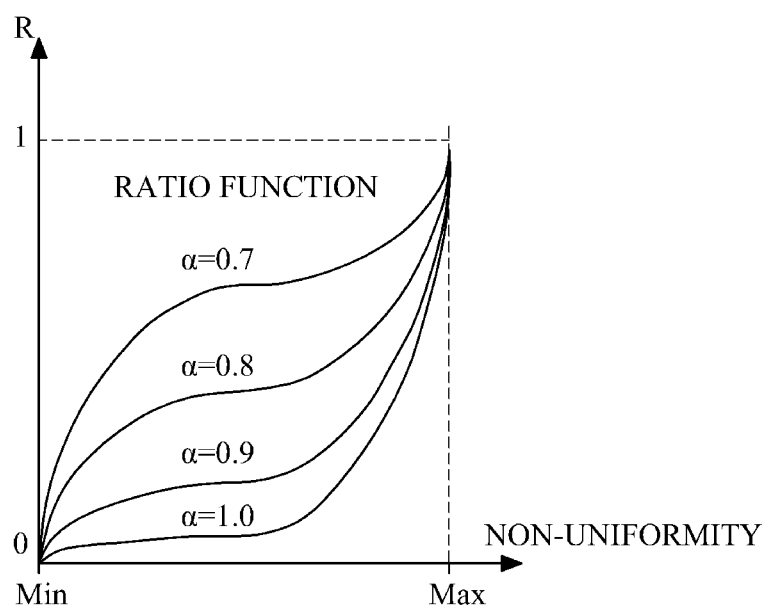
FIG. 9 is a diagram showing an example ratio function.

FIG. 9 is a diagram showing an example ratio function.

As shown in FIG. 9, the ratio function represents a synthesis ratio of a refocusing image according to the non-uniformity. The minimum value (Min) of the non-uniformity represents an intensity value of light field data when the intensity value is equal to the uniform intensity value, and the minimum value is represented by 0 in the example of FIG. 9. The maximum value (Max) of the non-uniformity represents an intensity value of light field data which is the furthest from the uniform intensity value. In FIG. 9, the ratio function varies depending on the alpha value. However, another example of the ratio function may be provided, for example, in a constant form independent from the alpha value.

Referring again to FIG. 8, when the sum of each synthesis ratio of the enlarged refocusing image and the high-resolution image is 1, the ratio non-uniformity map generator 820 may be configured to include information about the synthesis ratio of at least one of the enlarged refocusing image and the high-resolution image.

The ratio non-uniformity map enlarger 840 may enlarge the ratio non-uniformity map at the setting ratio (m). The ratio non-uniformity map may be enlarged to have the same size as those of the enlarged refocusing first image and the high-resolution image. For example, if the enlarged refocusing first image and the high-resolution image have the size of mS×mT, the ratio-non uniformity map may be enlarged to have the size of mS×mT.

Figure 10A:
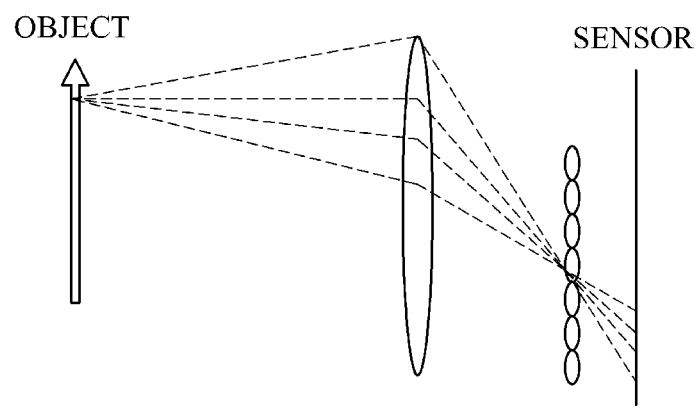
FIG. 10A is a diagram showing an example high-resolution image reconstruction.
Figure 10B:
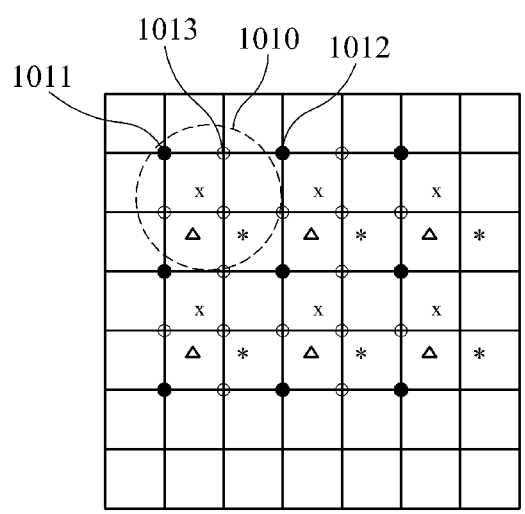
FIG. 10B is another diagram showing an example high-resolution image reconstruction.
Figure 10C:
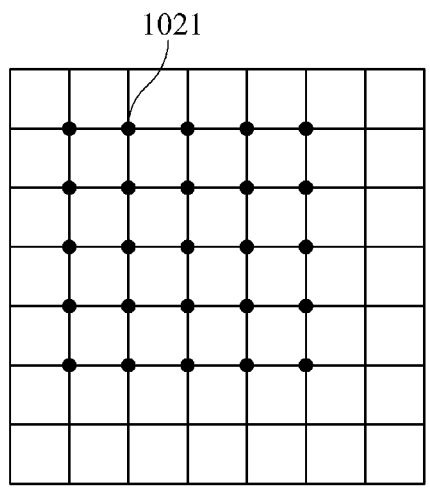
FIG. 10C is another diagram showing an example high-resolution image reconstruction.

FIGS. 10A to 10C are diagrams showing an example high-resolution image reconstruction.

As shown in FIG. 10A, light field data may be captured. As described above, when an image is acquired using the light field data, a plurality of low-resolution images or sub-sampled images, with reduced spatial resolution compared to an ordinary photographic device using the same photosensor array, may be acquired. One image among the plurality of low-resolution images may be determined as a standard image frame, and the sub-sampled low-resolution image frames, excluding the standard image frame, may be selected and determined as at least one reference image frame.

FIG. 10B illustrates the result of registering light field data on a high-resolution (HR) grid.

FIG. 10B shows registration of light field data constituting a standard image frame and a reference image frame selected on a HR grid. In FIG. 10B, "●" "×", "Δ" and "*" represent optical field data about one point on an object, each representing light field data that passed through a different location of the main lens. When an image frame formed using light field data that is indicated by "●", includes points 1011 and 1012, and is the standard image frame, it may be registered on the HR grid as shown in FIG. 10B.

A high-resolution image frame may be reconstructed as shown in FIG. 10C. The resolution of the standard image frame may be increased by interpolating values between light field data constituting the standard image frame. For example, a value 1013 on the HR grid between light field data 1011 and light field data 1012 may be interpolated using light field data included in an area 1010 on the HR grid of FIG. 10B.

Figure 11:
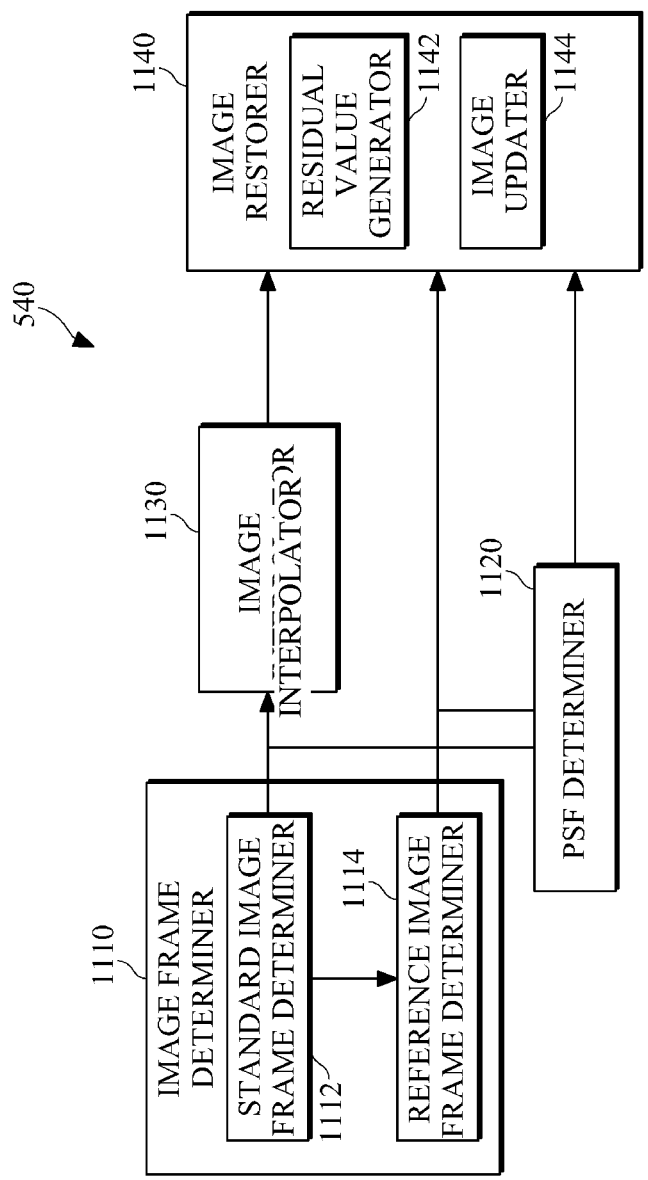
FIG. 11 is a block diagram showing an example high resolution image generator shown in FIG. 5.

FIG. 11 is a block diagram showing an example high resolution image generator shown in FIG. 5.

The high-resolution image generator 540 may include an image frame determiner 1110, a point spread function determiner 1120, an image interpolator 1130, and an image restorer 1140.

The image frame determiner 1110 may determine one standard image frame and at least one reference image frame using light field data about a scene, and may include a standard image frame determiner 1112 and a reference image frame determiner 1114.

The standard image frame determiner 1112 may determine, as the standard image frame, a view image that may be generated by use of a portion of light field data, the position of which may be determined by the determined alpha value. The reference image frame determiner 1114 may determine, as a reference image frame, at least one view image, seen from at least one angle selected from among view images generated by use of a position determined portion of light field data excluding a view image determined, as the standard image frame. The position of the portion of light field data may be determined by the determined alpha value.

The point spread function determiner 1120 may determine a point spread function based on the amount of sub-pixel displacement between the each reference image frame and the standard image frame.

The amount of sub-pixel displacement may be a location difference between at least one light field data constituting the standard image frame and light field data of a reference image frame respectively corresponding to the at least one light field data. The location difference may not represent the difference in a sensing location in the photosensor, but may represent the amount of sub-pixel displacement between the standard image frame and the reference image frame. The location difference may be calculated by an image algorithm processing. The amount of sub-pixel displacement of view images, that is, the amount of sub-pixel displacement between the standard image frame and the reference image frame, may be calculated by an image processing algorithm generally known or to be known in the future, such as the Lucas Kanade algorithm.

The amount of sub-pixel displacement may be a setting value according to the position of the main lens passing light field data for each point of an object or according to the configuration of the data capturer 140. The amount of sub-pixel displacement may be adjusted according to the distance from the object. In addition, the amount of sub-pixel displacement may be predetermined according to the alpha value. The alpha value and the amount of sub-pixel displacement may be preset and stored in a predetermined storage of the image processing apparatus 100 to be used for generating the high-resolution image.

The PSF determiner 1120 may determine each two-dimensional (2D) Gaussian function, based on the sub-pixel displacement between the standard image frame and each reference image frame, as the point spread function. The PSF may be determined differently for each reference image compared to the standard image, and may be determined by the sub-pixel displacement corresponding to each predetermined reference image regardless of update of the standard image frame.

The image interpolator 1130 may interpolate the standard image frame into a high-resolution standard image frame having a higher resolution than the standard image frame. The image interpolator 1130 may interpolate using, e.g., a bilinear interpolation method or a bicubic interpolation method.

The image restorer 1140 may restore a high-resolution image by updating the high-resolution standard image frame using the generated high-resolution image frame, the point spread function, and at least one reference image frame. The image restorer 1140 may perform several high-resolution image processing methods for generating the high-resolution image frame using a plurality of low-resolution image frames.

In one example, the image restorer 1140 may include a residual value generator 1142 and an image updater 1144.

The residual value generator 1142 may generate a residual value using the generated high-resolution standard image frame, one of the reference image frames, and the point spread function based on the one reference image frame and the standard image frame. For instance, the residual value may be a value of the one reference image frame (e.g., observed image) minus the convolution of the high-resolution standard image frame with the point spread function (e.g., estimated image). The image updater 1144 may update the high-resolution standard image frame using the residual value (e.g., the image obtained by subtracting the estimated image from the observed image).

Also, when the high-resolution standard image frame is updated, the residual value generator 1142 may generate the residual value using the updated high-resolution standard image frame, another one of the reference image frames, and the point spread function based on the anther one of the reference image frames and the standard image frame. For instance, the residual value may be a value of the another reference image frame minus the convolution of the updated high-resolution standard image frame with the point spread function. The image updater 1144 may update the high-resolution standard image frame using the residual value.

These operations may be repeated until the operations have been performed on every one of the plurality of reference images. For example, when there are ten reference image frames, the above-described updating operation is performed ten times. The method of updating the high-resolution standard image frame using the residual value generated as described above may employ various high-resolution image restoration techniques, such as projection onto convex sets (POCS).

The high-resolution standard image frame updating operation may be repeated until a desired quality of the restored high-resolution image is reached. For example, after completing update operations by using ten reference image frames, an operation of updating a generated high-resolution image using the ten reference image frames and the PSF may be repeated until the residual value falls below a particular critical value.

Figure 12A:
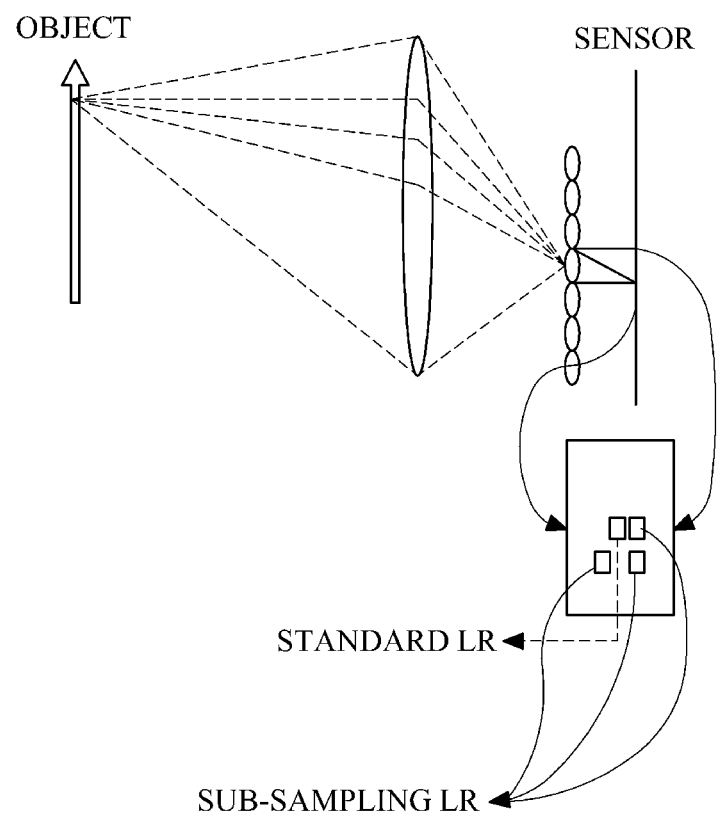
FIG. 12A is a diagram showing an example technique of selecting a standard image frame and a reference image frame.
Figure 12B:
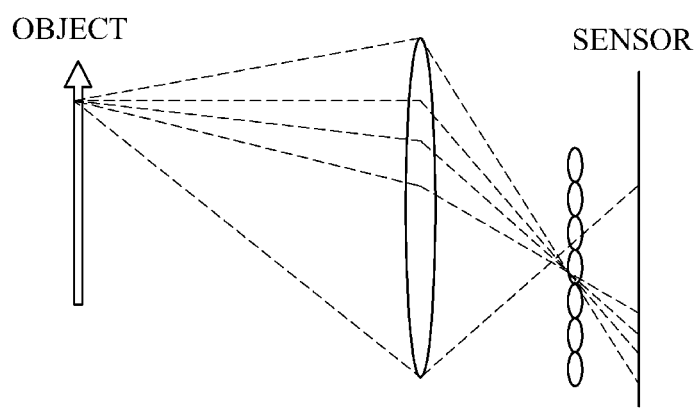
FIG. 12B is another diagram showing an example technique of selecting a standard image frame and a reference image frame.

FIGS. 12A and 12B illustrate an example technique of selecting a standard image frame and a reference image frame.

FIG. 12A shows light field data that is captured when the alpha value α is 1 and the refocusing plane matches to the photographic plane on the microlens array. FIG. 12B shows light field data that is captured when the alpha value α is not 1 and the refocusing plane does not match to the photographic plane.

As shown in FIG. 12A, when the alpha value α is 1, the image frame determiner 1110 may determine one image frame from among image frames generated using light field data and seen at least one angle as a standard image frame, and may determine at least one image frame from among the generated at least one image frame, excluding the standard image frame, as at least one reference image frame.

As shown in FIG. 12B, when the alpha value α is not 1, the position of light field data may be changed compared to that of light field data shown in FIG. 12A. Accordingly, obtained view images may be different from those obtained in FIG. 12A, and a standard image frame and a reference image frame may be newly defined using the obtained view images. The amount of sub-pixel displacement between the determined standard image frame and reference image frame may be identified. The amount of sub-pixel displacement may be determined with reference to FIG. 13C, or may be measured based on a corresponding alpha value.

Figure 13A:
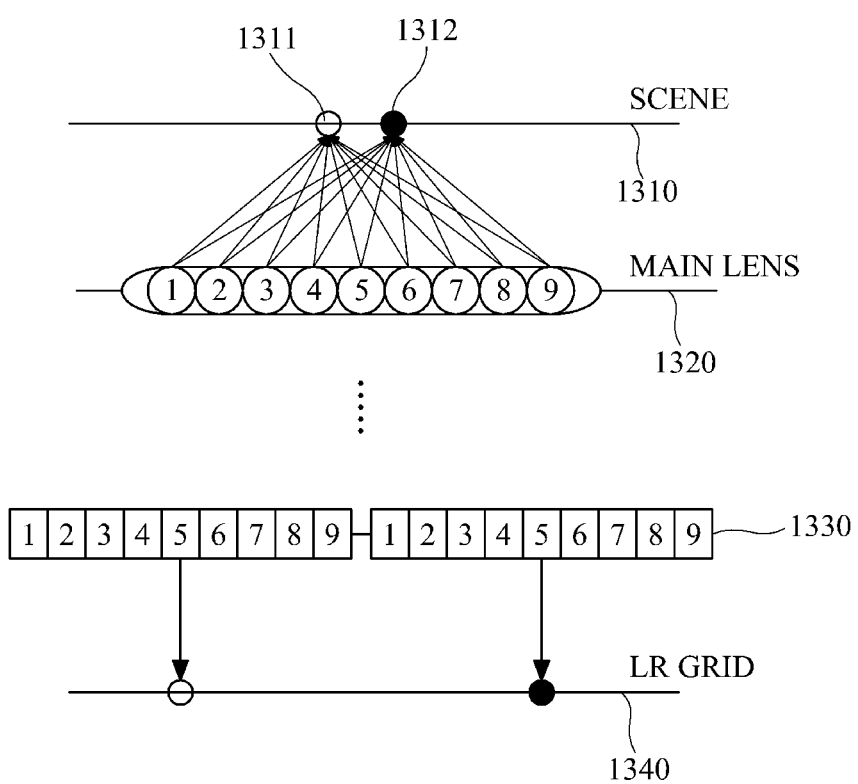
FIG. 13A is a diagram showing an example sub-pixel displacement compared to a standard image frame based on light field.
Figure 13B:
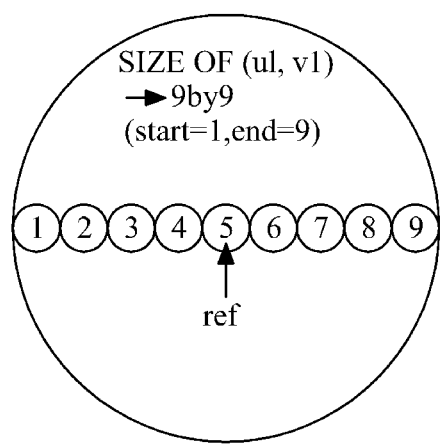
FIG. 13B is another diagram showing an example sub-pixel displacement compared to a standard image frame based on light field.
Figure 13C:
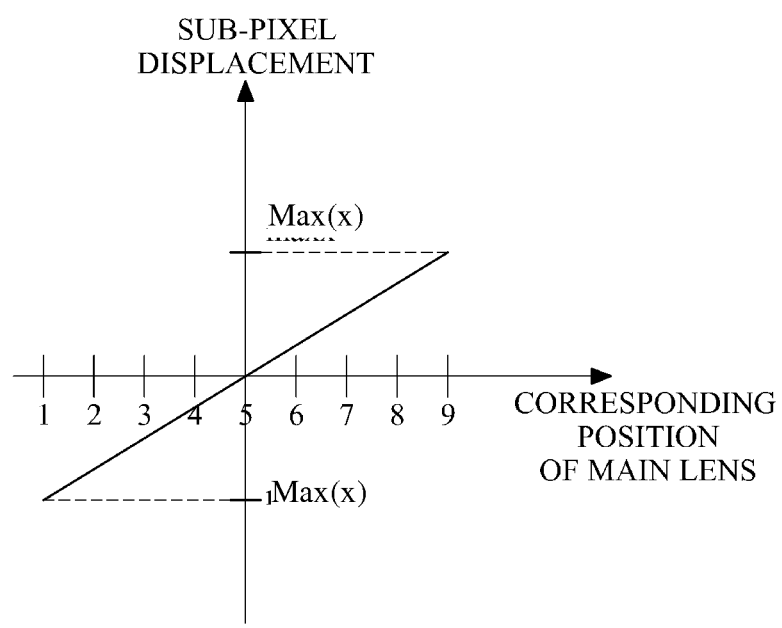
FIG. 13C is another diagram showing an example sub-pixel displacement compared to a standard image frame based on light field data.

FIGS. 13A to 13C illustrate sub-pixel displacement compared to a standard image frame based on light field data.

FIG. 13A shows a light signal from objects 1311 and 1312 of a scene 1310 passing through a main lens 1320, having nine sub-apertures ①-⑨, and a light signal passing through each sub-aperture of the main lens 1320, incident on a light pixel corresponding to the number of sub-apertures in a light sensor 1330. Reference numeral 1340 represents sensed data defined in position on a low-resolution (LR) grid. In the example shown in FIG. 13A, a sensed value sensed by the fifth light sensor (e.g., intensity) is shown on the LR grid, but intensities sensed in pixels of the remaining light sensors also are defined on the LR grid.

FIG. 13B shows an example in which the sensed LR data (e.g., light field data) is data that has passed through sub-apertures of the main lens 1320. For example, a (u,v) coordinate for sub-aperture ① is represented as (u1,v1). In FIGS. 13A and 13B, for ease of description, the arrangement of sub-apertures of the main lens 1320 and the arrangement of pixels of the light sensor 1330 are in a line, but the sub-aperture arrangement and the pixel arrangement may have different forms. The phrase "SIZE OF . . . " in FIG. 13B is a size of angular data. As an example, a microlens may define the size of angular data. For example, where a microlens contains 9×9 pixels, the parameter used for the "SIZE OF . . . " is 9×9.

FIG. 13C shows an example of the amount of sub-pixel displacement of reference image frames with respect to a standard image frame.

As shown in FIG. 13C, data passing through sub-apertures of the main lens may define an amount of sub-pixel displacement with respect to the standard image frame. In FIG. 13C, it may be presumed that an image frame made up of light field data passing through a fifth sub-aperture may be determined as the standard image frame, an arrangement difference between light field data passing through a first sub-aperture and light field data passing through a ninth sub-aperture may be one pixel, and a sub-pixel displacement may be proportional to a main lens transmission location, as shown in the example of FIG. 13C. In one example, when maxx is defined as 0.5, an image frame including light field data passing through the sixth sub-aperture may be determined to have a pixel shift of 0.125 with respect to the standard image frame.

FIG. 14 illustrates generation of an example high-resolution standard image frame based on light field data.

In order to form the standard image frame into the high-resolution image, a size for improved resolution may be determined, and the standard image frame may be enlarged to the determined size by signal processing, for example, by an interpolation method, such as bilinear interpolation or bicubic interpolation.

Reference numeral 1410 denotes sensed light field data, reference numeral 1420 denotes data of a standard image frame displayed on an LR grid, and reference numeral 1430 denotes an example of high-resolution processed data of the standard image frame displayed on an HR grid. "●" denotes data of the standard image frame, and "○" denotes data interpolated using data of the original standard image frame.

Figure 15:
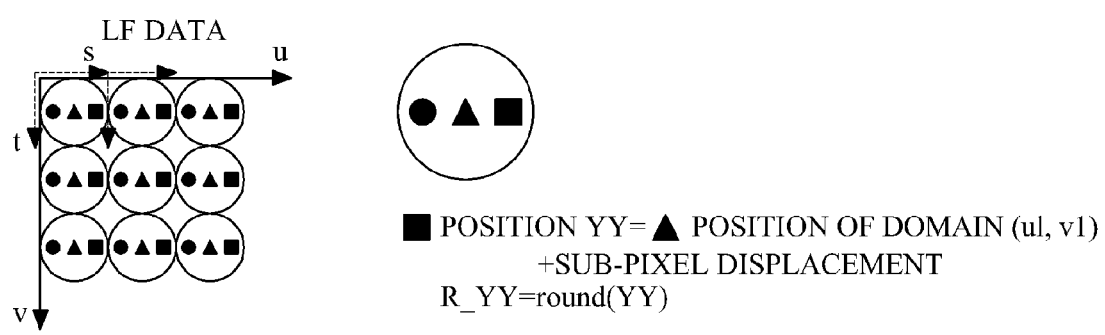
FIG. 15 is a diagram showing one example of an example calculation of a point spread function (PSF) based on a standard image frame.

FIG. 15 shows one example of the calculation of a PSF based on a standard image frame. Light field (LF) data shown on the left side of FIG. 15 illustrates a brief form of light field data acquired for explaining an example method of calculating a PSF. "●", "▲", and "■" represent light field data about one point on an object.

The PSF may be expressed according to Equation 5 shown below:

$$PSF(\sigma) = \exp\left(-\frac{(YY - R\_YY)^2 + (XX - R\_XX)^2}{2 \cdot \sigma^2}\right), \quad (5)$$

where $\sigma^2$ is a parameter for generating a Gaussian shape.

For example, "■ position XX" represents a total value of sub-pixel displacement defined in an x-axis direction, at a point location in a standard ▲ (u,v) domain. "R_XX" denotes the center location of the peak of a Gaussian function of the PSF as being around (XX). Also, "■ position YY" represents a total value of sub-pixel displacement defined in a y-axis direction, at a point location in a standard ▲ (u,v) domain. "R_YY" denotes the center location of the peak of a Gaussian function of the PSF as being around (YY). That is, the PSF may be defined based on light field location. The Gaussian envelope of the PSF may change according to the degree of sub-pixel displacement.

Figure 16:
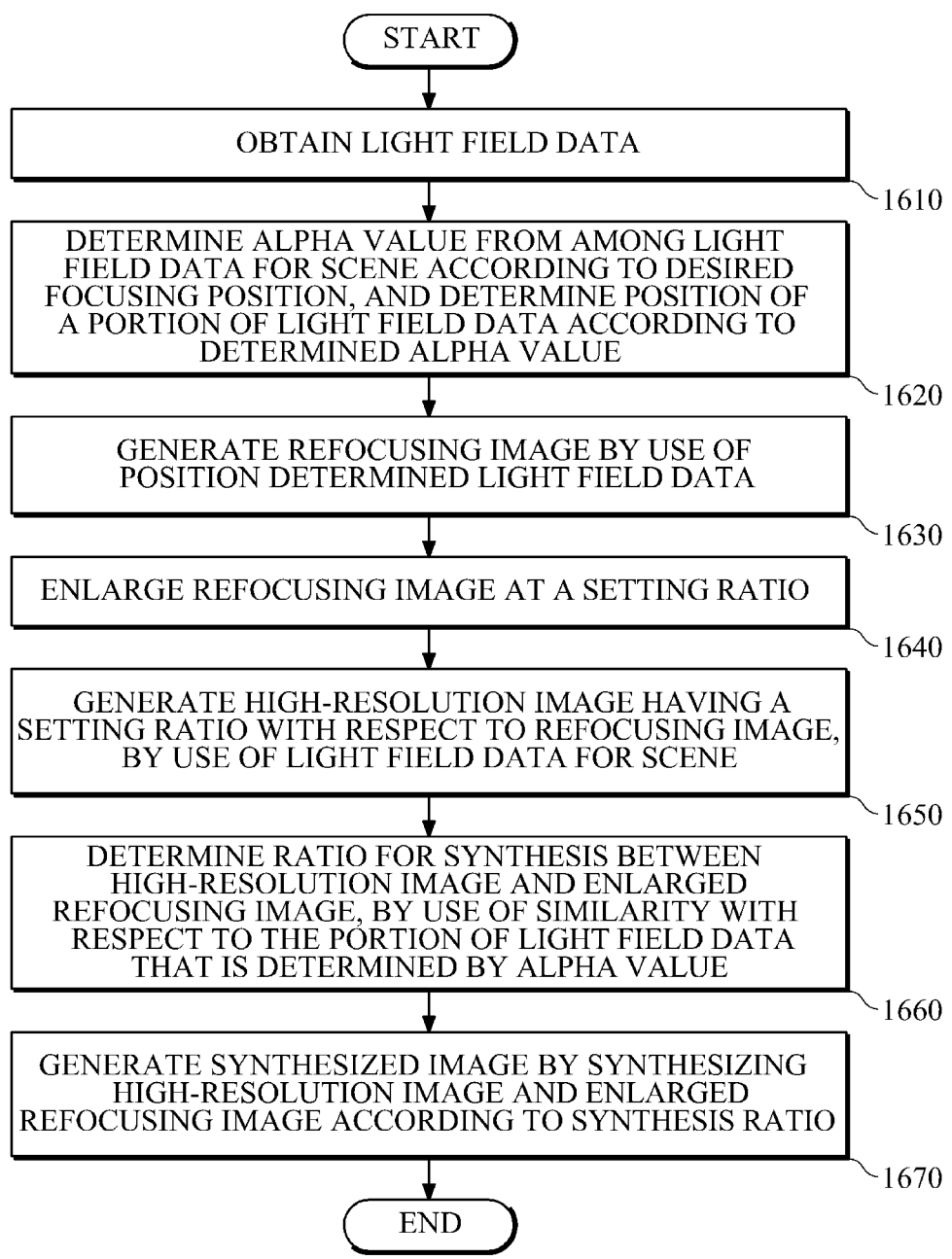
FIG. 16 is a flowchart showing an example method of generating a high-resolution image for a desired focusing region by use of light field data.

FIG. 16 illustrates an example method of generating a high-resolution image using light field data.

In operation 1610, the light field data capturer 140 may capture light field data for a scene. In operation 1620, the light field data determiner 510 may determine an alpha value according to a desired focusing position among light field data corresponding to a scene, and may determine the position of a portion of light field data by use of the determined alpha value.

In operation 1630, the refocusing image generator 520 may generate a refocusing image by use of the position determined portion of light field data.

In operation 1640, the image synthesizer 560 may enlarge the refocusing image at a setting ratio.

In operation 1650, the high-resolution image generator 540 may generate a high-resolution image having a predetermined setting ratio relative to the refocusing image, by use of the light field data for the scene.

In operation 1660, the synthesis ratio determiner 550 may determine a ratio for local synthesis between the high-resolution image and an enlarged image of the refocusing image by use of a similarity with respect to the position determined portion of light field data that may be selected according to the alpha value.

In operation 1670, the image synthesizer 560 may generate a synthesized image by synthesizing the high-resolution image and the enlarged image of the refocusing image according to the local synthesis ratio.

Figure 17:
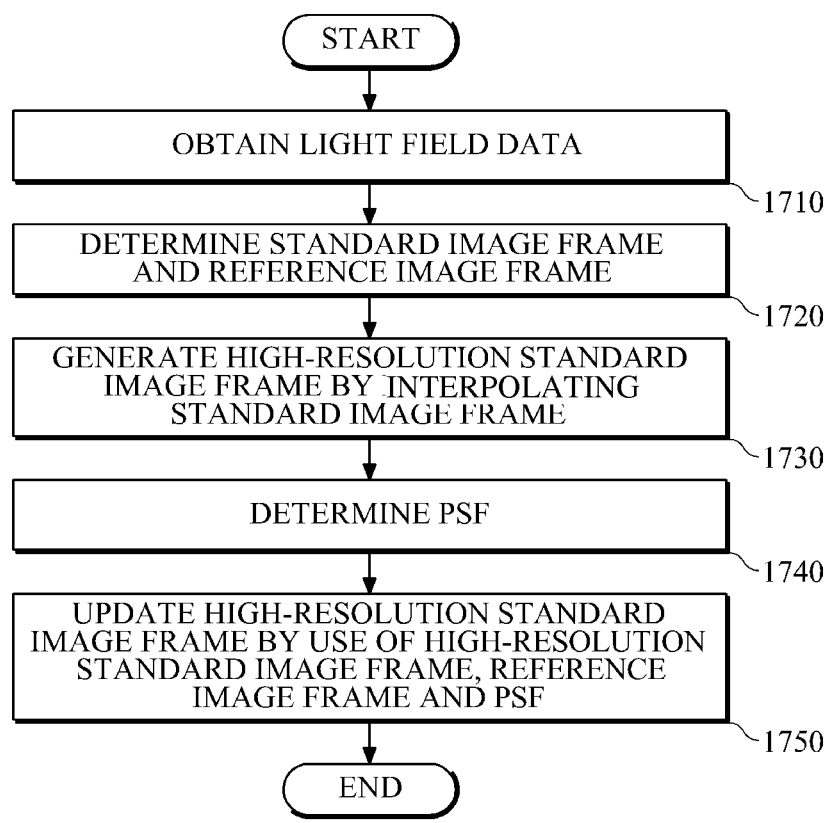
FIG. 17 is a flowchart showing an example method of generating a high-resolution image by use of light field data.

FIG. 17 is a flowchart showing an example method of generating a high-resolution image by use of light field data.

In operation 1710, the light field data capturer 140 may capture light field data for a scene. In operation 1720, the high-resolution image generator 540 may determine one standard image frame and at least one reference image frame by use of the captured light field data. In operation 1730, the high resolution image generator 540 may determine a point spread function based on the amount of sub-pixel displacement of the at least reference image frame with respect to the standard image frame.

In operation 1740, the high-resolution image generator 540 may generate a high-resolution standard image frame having a higher resolution than the standard image frame by interpolating the standard image frame. In operation 1750, the high-resolution image generator 540 may restore the high-resolution image by updating the high-resolution standard image frame by use of the generated high-resolution standard image frame, the point spread function, and the at least one reference image frame.

The operation for restoring the high-resolution image may be performed repeatedly until it has been performed for every reference image. A projection onto convex set (POCS) method may be used to generate sub-pixel unit high-resolution images.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the device described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The term "pixel," as used herein, refers to a photo-element unit cell containing at least a photosensor for converting photons to electrical changes. The detector or photosensor of each pixel may be implemented, as nonlimiting examples only, as a pinned photodiode, a p-n junction photodiode, a Schottky photodiode, a photogate, or any other suitable photoconversion device or device that may accumulate and/or store photocharges.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
a light field data position determiner configured to determine a position of a portion of light field data among light field data corresponding to a scene, according to a desired focusing position;
a refocusing image generator configured to generate a refocusing first image by use of the position determined portion of light field data;
a high resolution image generator configured to generate a high-resolution image comprising a predetermined setting ratio, relative to the refocusing first image;
a synthesis ratio determiner configured to determine a ratio for local synthesis between the high-resolution image and an enlarged image of the refocusing first image, by use of a similarity with respect to the position determined portion of light field data; and
an image synthesizer configured to generate a synthesized image by synthesizing the high-resolution image and the enlarged image of the refocusing first image, according to the local synthesis ratio, wherein the synthesis ratio determiner is further configured to determine the ratio for local synthesis, such that the high-resolution image is synthesized with a higher synthesis ratio for a portion comprising a higher similarity with respect to the position-determined portion of light field data than a portion comprising a lower similarity with respect to the position-determined portion of the light field data, and
wherein the desired focusing position corresponds to a highest sharpness refocusing image and the refocusing first image corresponds to the highest sharpness refocusing image.

2. The image processing apparatus of claim 1, wherein the light field data position determiner is further configured to:
- set a second image, corresponding to a part of an image representing the scene, and comprising the desired focusing position;
- generate a plurality of refocusing images for the second image while changing a varying alpha value, the varying alpha value representing a relationship between a photographic plane and a refocusing plane;
- determine a final alpha value, from the varying alpha value, the final alpha value allowing a highest sharpness refocusing image to be generated for the second image; and
- determine the position of the portion of light field data by use of the determined final alpha value.

3. The image processing apparatus of claim 1, wherein the synthesis ratio determiner comprises:
- a non-uniformity map generator configured to generate a non-uniformity map representing a non-uniformity of intensity of light field data at the determined position;
- a ratio non-uniformity map generator configured to generate a ratio non-uniformity map comprising information about the ratio for local synthesis between the high-resolution image and the enlarged image of the refocusing first image, by use of the non-uniformity map; and
- a ratio non-uniformity map enlarger configured to enlarge the ratio non-uniformity map at the setting ratio.

4. The image processing apparatus of claim 1, wherein the image synthesizer is further configured to:
- enlarge the refocusing first image at the setting ratio; and
- synthesize the enlarged image of the refocusing first image and the high-resolution image at the determined ratio for local synthesis.

5. The image processing apparatus of claim 2, wherein the high-resolution image generator comprises:
- an image frame determiner configured to determine a standard image frame and at least one reference image frames, by use of the position determined portion of light field data comprising the position, the position being determined by the determined final alpha value;
- a point spread function determiner configured to determine a point spread function, based on an amount of sub-pixel displacement of the at least one reference image frame with respect to the standard image frame;
- an image interpolator configured to generate a high-resolution standard image frame comprising a higher resolution than the standard image frame by interpolating the standard image frame; and
- an image restorer configured to restore the high-resolution image by updating the high-resolution standard image frame using the generated high-resolution standard image frame, the point spread function, and the at least one reference image frame.

6. The image processing apparatus of claim 4, wherein the amount of sub-pixel displacement represents a position difference between light field data corresponding to the standard image frame and light field data corresponding to each reference image frame.

7. The image processing apparatus of claim 4, wherein the image frame determiner is further configured to:
- determine a view image seen from an angle as the standard image frame; and
- determine at least one view image seen from another angle as the reference image frame by use of the position determined portion of light field data comprising the position, the position being determined by the final alpha value.

8. The image processing apparatus of claim 4, wherein the point spread function determiner is further configured to determine, as the point spread function, a two-dimensional Gaussian function, based on the amount of sub-pixel displacement of the each reference image frame with respect to the standard image frame.

9. The image processing apparatus of claim 4, wherein the image restorer comprises:
- a residual value generator configured to generate a residual value by use of the generated high-resolution standard image frame, one of the reference image frames, and a point spread function based on the one reference image frame and the standard image frame; and
- an image updater configured to update the high-resolution standard image frame by use of the residual value.

10. The image processing apparatus of claim 9, wherein the residual value comprises a value of the one reference image frame minus a convolution of the high-resolution standard image frame with the point spread function.

11. The image processing apparatus of claim 9, wherein, if the high-resolution standard image frame is updated, the residual value generator is further configured to generate a residual value by use of the updated high-resolution standard image frame, another one of the at least one reference image frame, and a point spread function based on the another one of the at least one reference image frame and the standard image frame.

12. The image processing apparatus of claim 1, further comprising a light field data capturer, the light field data capturer comprising:
- a first optical unit configured to form an image of an object;
- a photo sensor array configured to capture light rays; and
- a second optical unit disposed between the first optical unit and the photo sensor array, and configured to direct the light rays toward the photo sensor array by separating the light rays based on the direction of the light rays.

13. An image processing method, the method comprising:
- determining a position of a portion of light field data among light field data corresponding to a scene, according to a desired focusing position;
- generating a refocusing first image by use of the position determined portion of light field data;
- generating a high-resolution image comprising a predetermined setting ratio, relative to the refocusing first image;
- determining a ratio for local synthesis between the high-resolution image and an enlarged image of the refocusing first image, by use of a similarity with respect to the position determined portion of light field data; and
- generating a synthesized image by synthesizing the high-resolution image and the enlarged image of the refocusing first image, according to the local synthesis ratio,
- wherein, in the determining of the ratio for local synthesis, the ratio for local synthesis is determined such that the high-resolution image is synthesized with a higher synthesis ratio for a portion comprising a higher similarity with respect to the position-determined portion of light field data than a portion comprising a lower similarity with respect to the position-determined portion of the light field data, and
- wherein the desired focusing position corresponds to a highest sharpness refocusing image and the refocusing first image corresponds to the highest sharpness refocusing image.

14. The image processing method of claim 13, wherein the determining of the position of the portion of light field data comprising:

setting a second image corresponding to a part of an image representing the scene and comprising the desired focusing position;

generating a plurality of refocusing images for the second image while changing a varying alpha value, the varying alpha value representing a relationship between a photographic plane and a refocusing plane;

determining a final alpha value, from the varying alpha value, the final alpha value allowing a highest sharpness refocusing image to be generated for the second image; and determining the position of the portion of light field data by use of the determined alpha value.

15. The image processing method of claim 13, wherein the determining of the ratio for local synthesis comprises:

generating a non-uniformity map representing a non-uniformity of intensity of light field data at the position determined by an alpha value representing a relationship between a photographic plane and a refocusing plane;

generating a ratio non-uniformity map including information about the ratio for local synthesis between the high-resolution image and the enlarged image of the refocusing first image by use of the non-uniformity map; and enlarging the ratio non-uniformity map at the setting ratio.

16. The image processing method of claim 13, wherein the generating of the synthesized image comprises:

enlarging the refocusing first image at the setting ratio; and synthesizing the enlarged image of the refocusing first image and the high-resolution image at the determined ratio for local synthesis.

17. The image processing method of claim 14, wherein the generating of the high-resolution image comprises:

determining a standard image frame and at least one reference image frames, by use of the determined alpha value;

determining a point spread function, based on an amount of sub-pixel displacement of the at least one reference image frame with respect to the standard image frame;

generating a high-resolution standard image frame comprising a higher resolution than the standard image frame, by interpolating the standard image frame; and restoring the high-resolution image by updating the high-resolution standard image frame using the generated high-resolution standard image frame, the point spread function, and the at least one reference image frame.

18. A method of processing an acquired four-dimensional (4D) light field, the method comprising:

determining a desired focusing position and estimating an alpha value for the focusing position, the alpha value representing a relationship between a photographic plane and a refocusing plane;

generating a refocusing image from angular data according to the alpha value;

generating a high-resolution image by increasing a resolution of a focusing region, based on a sub-pixel displacement of the angular data according to the alpha value;

dividing the focusing region from an out-of-focus region by checking a similarity of the angular data according to the alpha value; and performing fusion on the refocusing image and the high-resolution image, wherein the high-resolution image is synthesized with a higher synthesis ratio for a portion comprising a higher similarity with respect to a position-determined portion of light field data than a portion comprising a lower similarity with respect to the position-determined portion of the light field data, and wherein the alpha value corresponds to a highest sharpness refocusing image and the refocusing image corresponds to the highest sharpness refocusing image.

19. The method of claim 18, wherein the alpha value is determined by varying the alpha value until a highest sharpness refocusing image is generated.

20. A non-transitory computer-readable information storage medium storing a program for causing a computer to implement the method of claim 13.

21. A non-transitory computer-readable information storage medium storing a program for causing a computer to implement the method of claim 18.

22. An image processing method, comprising:

from light field data corresponding to a scene, generating a refocusing image corresponding to a part of an image representing the scene, the refocusing image including a desired focusing position;

generating an enlarged image of the refocusing image;

generating a high resolution image corresponding to the enlarged image using the light field data corresponding to the part of the image; and generating a synthesized image based on the high resolution image and the enlarged image, wherein the high-resolution image is synthesized with a higher synthesis ratio for a portion comprising a higher similarity with respect to a position-determined portion of light field data than a portion comprising a lower similarity with respect to the position-determined portion of the light field data, and wherein the desired focusing position corresponds to a highest sharpness refocusing image and the refocusing image corresponds to the highest sharpness refocusing image.

23. The method of claim 22, wherein the refocusing image comprises a highest sharpness among a plurality of images corresponding to the part of the image.

* * * * *